United States Patent [19]

Lenhart

[11] Patent Number: 4,653,964
[45] Date of Patent: Mar. 31, 1987

[54] SINGLE FILER BLOW-BACK APPARATUS

[75] Inventor: Ronald A. Lenhart, Lakewood, Colo.

[73] Assignee: Precision Metal Fabricators, Inc., Arvada, Colo.

[21] Appl. No.: 749,543

[22] Filed: Jun. 27, 1985

[51] Int. Cl.$^4$ ............................................. B65G 51/02
[52] U.S. Cl. ..................................... 406/86; 221/159; 221/175
[58] Field of Search ............................. 406/86, 87, 88; 198/347, 453, 493; 271/97, 195; 221/159, 175

[56] References Cited

U.S. PATENT DOCUMENTS

| 3,198,515 | 8/1965 | Pitney | 271/97 |
| 4,182,586 | 1/1980 | Lenhart . | |
| 4,253,783 | 3/1981 | Lenhart . | |
| 4,347,022 | 8/1982 | Lenhart | 406/88 |
| 4,500,229 | 2/1985 | Cole et al. | 406/88 |

FOREIGN PATENT DOCUMENTS 2061856 5/1981 United Kingdom ................. 406/88

Primary Examiner—Jeffrey V. Nase
Attorney, Agent, or Firm—Fields, Lewis, Pittenger & Rost

[57] ABSTRACT

An air single filer apparatus for receiving cylindrical articles in upright position in random bulk and discharging them serially in horizontal single file is provided. Articles are received into a bulk storage zone, from where they move to a layout zone where they are aligned in horizontal single file and discharged along a path. Alignment is achieved by gravity and also by impacting the articles with pressurized air from a plenum. The invention uses slanted slots in a top plenum wall of the layout zone to use the Coanda effect to direct blow-back air along this wall without disturbing properly aligned articles therebelow. Also an adjustable horizontal blow-back slot at the downstream end of the layout path is provided for blowing air back upstream along the top wall, thereby creating a low pressure area adjacent the top wall in accordance with the Bernoulli Principle. The result of these air flows is a lifting force on unaligned articles which moves them upward, and a horizontal force on them which moves them upstream in the layout zone toward the bulk storage zone, while at the same time leaving aligned articles in aligned position. This effect is enhanced by having the top wall of the layout path parallel to the lower extremity of the sidewalls, thereby eliminating any potential Venturi effect due to a narrowing of the vertical opening to the layout zone at its upstream end.

5 Claims, 4 Drawing Figures

SINGLE FILER BLOW-BACK APPARATUS

TECHNICAL FIELD

This invention relates to air operated material handling equipment, and more particularly, to an air single filer apparatus for receiving cylindrical articles in upright position in random bulk and discharging them serially in horizontal single file.

BACKGROUND ART

In recent years, improvements in container fabricating and filling equipment and the increased rates required for more economical production have made improvements in article handling equipment highly desirable. Previously used chain, roller, and gravity handling systems are often too slow, cumbersome, or mechanically unreliable for current requirements. Pressurized air has been found to provide improved results in moving, sorting, elevating, turning, and dispensing articles of the type to be handled by the apparatus described herein.

Air single filer apparatuses have been known for some time in the prior art. One such apparatus is provided in my U.S. Pat. No. 4,253,783, which is a continuation-in-part of my earlier U.S. Pat. No. 4,182,586. That apparatus receives cylindrical articles in an upright position in random bulk and discharges them serially in horizontal single file. The articles are received in a bulk storage area, from where they are moved by gravity and air pressure to a layout zone. In the layout zone they are subjected to air blown back upstream under pressure, which aids their alignment into a horizontal single file for discharging. The speed and certainty with which nonaligned articles are moved back to a place where they may be aligned into the horizontal single file is important to the efficiency of such a device.

Articles in the layout zone of this apparatus will typically be either aligned articles in single file or unaligned articles located above the articles in single file. Unaligned articles will naturally seek a nested position resting between the upper portions of two aligned articles. Sufficient horizontal air pressure must be applied to the unaligned nested articles to cause them to roll up over the next rearwardly aligned article from their nested position between that article and the next downstream article in order to be moved backward. This requires a very rapid flow of air. This problem is exacerbated by the fact that the layout zone is typically narrower from top to bottom near its entrance than near its exit, thus creating a Venturi effect in the layout zone near the entrance. This creates a low pressure area above the aligned articles at the entrance to the layout zone causing an undesirable lifting force on aligned articles which tends to and occasionally causes them to be lifted out of alignment. In such a situation, the apparatus is adding to the problem it is intended to solve.

DISCLOSURE OF THE INVENTION

The disclosure of my earlier U.S. Pat. No. 4,253,783 issued Mar. 3, 1981, is hereby incorporated by reference.

In accordance with the present invention, an improved air single filer apparatus is provided for receiving cylindrical articles in upright position in random bulk and discharging them serially in horizontal single file. The apparatus includes a bulk storage zone for receiving the articles in bulk, and an adjacent layout zone having a discharge outlet at its downstream end and a layout path extending through the layout zone and between the bulk storage zone at one end and the discharge outlet at the other. A pair of spaced sidewalls define the apparatus and are spaced apart a distance slightly greater than an article to be worked on. Air is supplied to the apparatus through a plenum connected to a source of air under pressure and attached to each sidewall in a substantially coextensive relation. A row of air jet openings through each sidewall deliver jets of air from the plenum to the layout zone for advancing the articles in single file from the bottom of the bulk storage zone to the discharge outlet, with the rows being approximately parallel to the lower extremities of the sidewalls. A horizontal wall acts as the top of the layout zone and extends between the sidewalls just over two article diameters above the lower extremity of the sidewalls. The horizontal wall terminates at its upstream end in a first vertical wall adjacent the bulk storage zone, and terminates at its downstream end in a second vertical wall above the discharge outlet, with the horizontal wall and both vertical walls also acting as walls of the plenum. Preferably, the horizontal wall is parallel to the lower extremity of the sidewalls. A blow-back opening in the first vertical wall blows articles back toward the bulk storage zone, by use of air under pressure from the plenum. Another blow-back opening in the form of a horizontal slot in the second vertical wall also communicates with the plenum, and blows air under pressure from the plenum upstream along the top wall, creating an upward draft effect on articles not aligned in the layout path and blowing them back toward the bulk storage zone. Preferably, the height of the horizontal slot is adjustable, allowing for regulation of the air flow through the layout zone. A series of lateral slots in the top wall communicate the layout path with the plenum and are slanted to blow air upstream along the top wall. This creates a rapid air flow along the top wall due to the Coanda Effect, causing a lifting effect on the containers which are out of alignment because of reduced air pressure over the containers due to the Bernoulli Principle, allowing them to be more easily blown back upstream toward the bulk storage zone.

More particularly, by utilizing the well-known Coanda effect, the air blown through the slanted lateral slots along the top wall of the layout zone tends to stay along the top wall and not be disbursed downwardly so as to disturb properly aligned articles. On the other hand, this air flow creates a lifting force on the misaligned articles nesting on top of the aligned articles due to the Bernoulli Principle, whereas the aligned articles are minimally affected. This aids in lifting articles from their nested position, allowing relatively less horizontal air flow to be utilized to blow the articles back toward the bulk storage zone. Because the volume of blow-back air is reduced, the Bernoulli Principle on the aligned articles in the layout zone is also reduced, thus relieving the problem seen in the prior art of lifting aligned articles out of their aligned position. Additionally, one embodiment of the invention provides means for adjusting the horizontal blow-back slot, thus allowing for close regulation of the air flow and giving finer control over the air flow in the layout zone. Furthermore, by providing a top wall which is essentially parallel to the lower extremities of the sidewalls so that there is no narrowing of the entrance to the layout zone as seen in the prior art, a Venturi will not be created at the entrance and hence the back flow of air through the layout zone will be substantially uniform.

Other advantages of this invention will be apparent from the description which follows, taken in conjunction with the accompanying drawings.

BEST MODE FOR CARRYING OUT THE INVENTION

Figure 1:
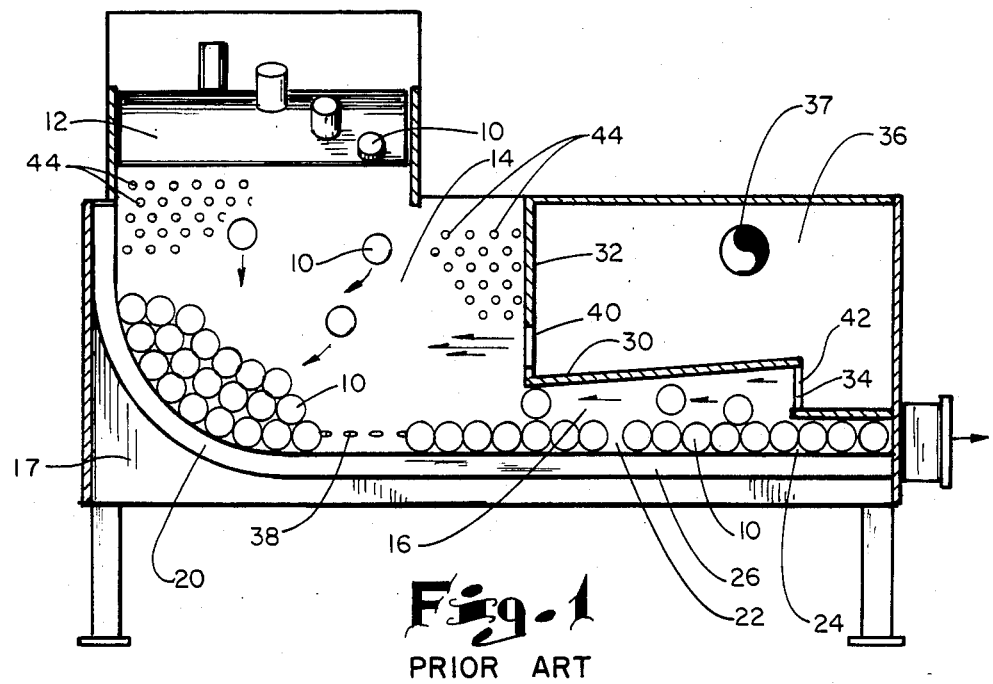
FIG. 1 is a cross-sectional side elevation of an embodiment of the prior art.
Figure 2:
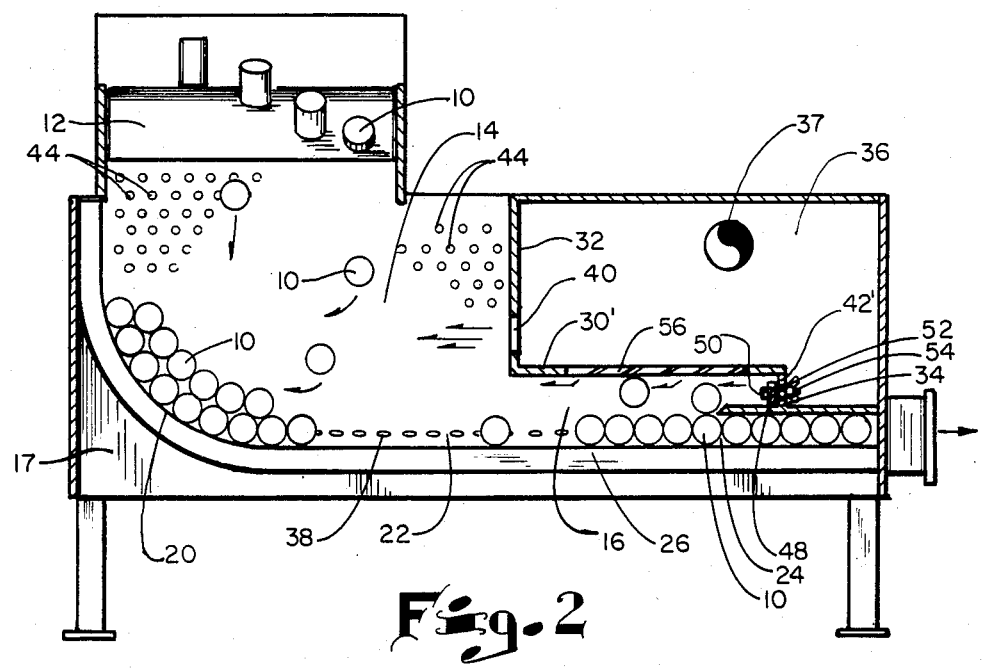
FIG. 2 is a cross-sectional side elevation, similar to FIG. 1 but showing a preferred embodiment of this invention.
Figure 3:
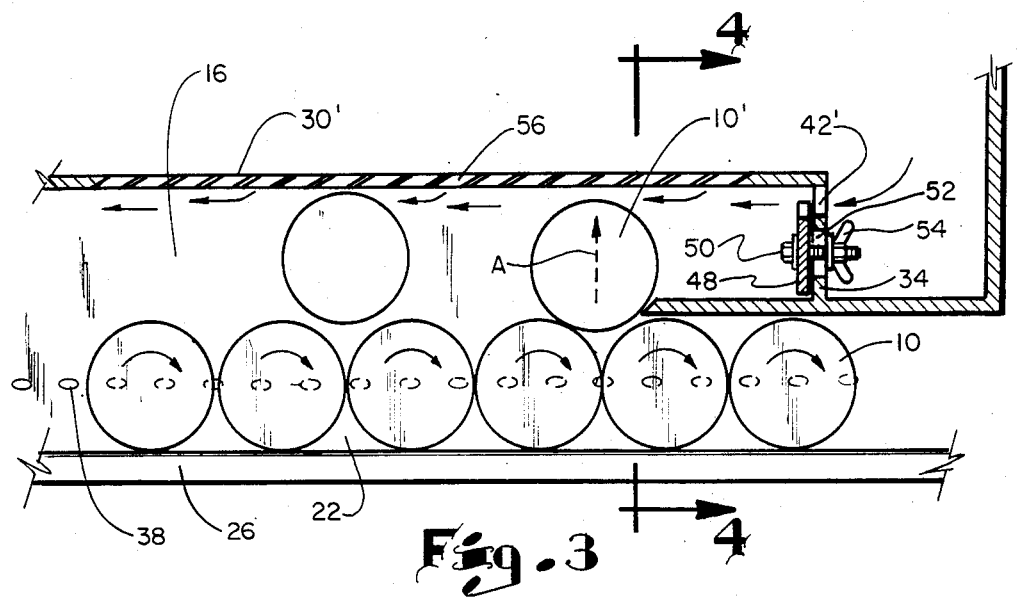
FIG. 3 is an enlarged, fragmentary cross-sectional side view of the layout zone of FIG. 2.
Figure 4:
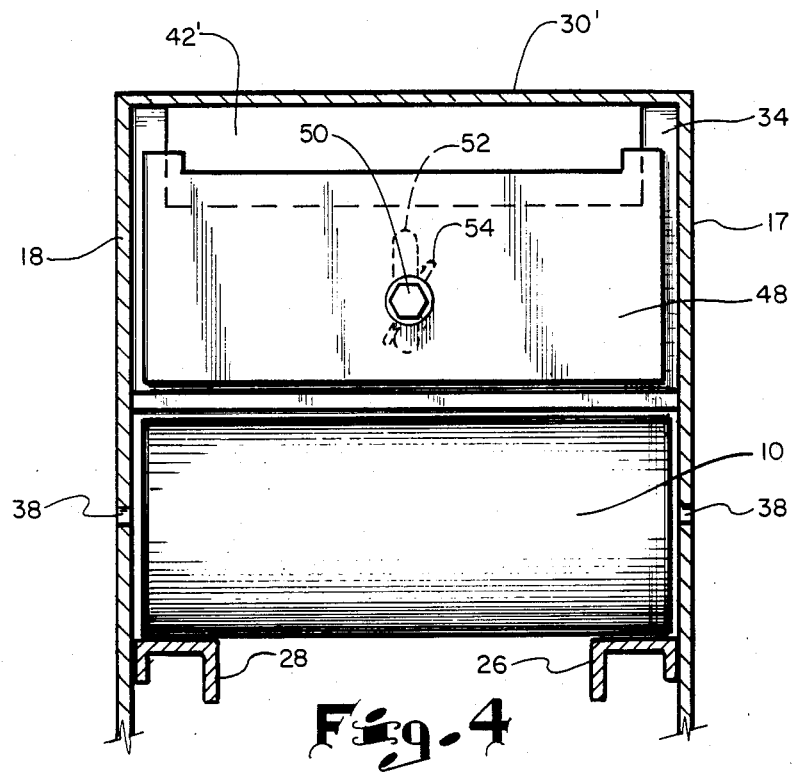
FIG. 4 is an enlarged section taken along line 4—4 of FIG. 3, showing details of a blow-back slot adjustment.

In accordance with the present invention, structural and operative features of an air single filer are shown in FIGS. 2 through 4, with FIG. 1 representing an air single filer as known in the prior art. In such illustrations the single filer components which form a part of this invention are disposed at the lower reaches of the device, and it should be understood that such air single filer components may be used together with the waterfall and bulk storage components of such illustrations, or the same single filer components could be combined with other bulk storage elements and components or could be arranged in a container handling line to receive containers being delivered on a constant or intermittent basis from other container handling apparatus.

Referring now to FIG. 1, the main components of an air single filer as known in the prior art are shown. With such arrangement, the articles 10 are introduced over the waterfall zone 12 into the bulk storage zone 14. The bulk storage zone 14 and the layout zone 16 are bounded on either side by spaced sidewalls 17 and 18, as best seen FIG. 4. The sidewalls 17 and 18 are disposed apart a distance just slightly greater than the length of the articles being handled when measured along their longitudinal axis. Such spacing will allow slight movement of the articles as they fall in the desired pattern, but the spacing is closely regulated so that the outside limiting edges of the articles will not be able to tilt sufficiently to cause locking entrapment thereof. Since the articles fall freely through the waterfall zone 12 and into the bulk storage zone 14, they will have a tendency to be self-stacking in the bulk storage zone in a closely nested arrangement. At a normal delivery rate, cylindrical articles of the illustrated relative size with respect to the illustrated single filer components will stack up in multiple rows along the full length of the inclined ramp 20.

The articles progress from the bulk storage zone 14 into the layout zone 16 to be aligned in single file in the layout path 22, and to exit through the discharge outlet 24. The layout zone 16 has spaced tracks 26 and 28 connected adjacent the lower extremities of sidewalls 17 and 18. The layout zone is bounded at its top by a top wall 30 extending between said sidewalls and terminating at its upstream end in first vertical wall 32 adjacent the bulk storage zone 14, and terminating at its downstream end in a second vertical wall 34 above the discharge outlet 24. A plenum 36 is provided adjacent the layout zone for delivering air under pressure into the system, said top wall and said first and second vertical walls also serving as walls of the plenum. Pressurized air is provided to said plenum through plenum inlet 37. The vertical distance between the top wall 30 and the upper edge of tracks 26 and 28 is generally less at the upstream end of the layout zone than at the downstream end.

In addition to the gravitational and mechanical aspects providing the desired movement pattern, the articles in the waterfall and bulk storage zones, as well as those in the layout zone, are moved directionally by the flow and impingement of air delivered under pressure to obtain or enhance the desired output result. As the articles move down the ramp and into the layout zone, they are subjected to the action of directed flow jet nozzles 38 aligned in rows substantially parallel to the upper edge of the rails 26 and 28. The jet nozzles are drilled through the sidewalls to communicate with the plenum 36 to deliver angularly disposed jets of air against the articles to move the articles down and forwardly into the layout path 22 through the discharge outlet 24.

A portion of the air from the plenum 36 which is not delivered through the nozzles 38 is blown through a first blow-back opening 40 in the first vertical wall 32, in order to blow unaligned articles back into the bulk storage zone. The remainder of the air from the plenum which is not delivered through the nozzles is blown through a second blow-back opening 42 in the second vertical wall 34 for blowing misaligned articles, which are being carried along on top of the properly aligned articles, upstream in the layout zone toward the bulk storage zone. Injection of pressurized air into the layout zone creates an above-ambient air pressure therein, between wall 30 and the row of aligned articles in layout path 22 which effectively block the escape of air between rails 26 and 28. This arrangment has the advantage of forcing unaligned cans downward and into alignment on the rails as the air rushes out when a space develops between the aligned articles. The remaining air is exhausted by passing through perforations 44 in the sidewalls, promoting an equilibrium pressure in the apparatus.

Unaligned articles above the aligned articles will naturally fall into a nested position between the upper portions of two aligned articles. When this nesting occurs, sufficient horizontal air pressure must be applied in the FIG. 1 embodiment to lift the nested article up and over the article adjacent to it on its upstream side, in order for said nested article to be blown back upstream. The rapid flow of air thus created causes a low pressure above the aligned articles in the layout zone due to the Bernoulli Principle, with the unwanted result that some aligned articles may be lifted out of alignment. This problem is made worse by the fact that the layout zone typically narrows in height toward its upstream end, creating a Venturi which further increases the velocity of the air and the lifting force on aligned articles due to the low pressure created thereabove and tending to lift them out of alignment.

The present invention, as best seen in FIG. 2, embodies all the elements of the prior art, while providing additional elements and changes in configuration which allow significant advantages over the prior art. In one embodiment of the present invention, the top wall 30' is horizontal, and thus parallel to the bottom tracks 26 and 28. This eliminates the Venturi effect of the prior art which resulted from the narrowing of the distance between the top wall 30 and the bottom tracks 26 and 28 at the upstream end of the layout zone.

Referring now to FIGS. 3 and 4, the present invention further provides a horizontal slot 42', which acts as the second blow-back opening. Preferably, the height of this slot is variable, as by the use of blowback damper 48 having bolt 50 and being slidably movable in adjusting slot 52 of plenum wall 34 when adjusting wing nut 54 is loosened. This configuration allows air to be blown back in an adjustable, controlled fashion along the top wall 30', due to the Bernoulli Principle, which creates a low pressure area which low pressure acts as a lifting force on the articles 10' in the layout path, as indicated by the upward vector arrow A. Since the lifting force is created by low pressure along the top wall 30', the aligned articles lying along the tracks 26 and 28 are minimally affected. This aids in lifting unaligned articles 10' from their nested position, allowing relatively less horizontal air flow to be utilized to blow the articles back toward the bulk storage zone 14. This reduction of the blow-back air flow reduces the effect of the Bernoulli Principle on the aligned articles in the layout path 22, thereby reducing the problem in the prior art of lifting aligned articles from their aligned positions.

As best shown in FIGS. 2 and 3, the present invention still further provides a series of lateral slots 56 communicating the layout path 22 with the plenum 36 and slanted to blow air upstream along the top wall 30'. The air blown through the slanted slots 56 curves upstream according to the well-known Coanda effect, creating a relatively rapid air flow along the top wall 30'. This creates a partial vacuum in the top of the layout zone, which causes a lifting force on unaligned articles 10', indicated by the upward vector arrow A. This upward force on the articles further aids in lifting upward unaligned articles, so that they may be more easily blown back to the bulk storage zone, while leaving aligned articles relatively unaffected. Thus, a more efficient system has been provided which efficiently repositions misaligned articles without adversely affecting properly aligned articles, and which also uses less power, since it operates with less air flow.

The invention has been described in detail with particular reference to a preferred embodiment thereof, but it will be understood that variations and modifications can be effected within the spirit and scope of the invention.

I claim:

1. An improved air single filer appartus for receiving cylindrical articles in upright position in random bulk and discharging them serially in horizontal single file, said apparatus comprising:
    a pair of spaced sidewalls having a lower extremity and defining a bulk storage zone and an adjacent layout zone having an outlet for discharging the articles in single file and a layout path extending through said layout zone between said bulk storage zone and said outlet, said sidewalls being spaced a distance slightly greater than the height of the article to be worked upon;
    a plenum connectable to a source of air under pressure attached to each sidewall in substantially coextensive relation therewith;
    a row of air jet openings through each of said sidewalls communicating said plenums with said layout zone and positioned generally parallel to said lower extremity for advancing the articles in a single file row from the bottom of said bulk storage zone to said outlet;
    means for exhausting air from said layout zone;
    a top wall in said layout zone extending between said sidewalls spaced just over two article diameters above said lower extremity of said sidewalls, said top wall terminating at its upstream end in a first vertical wall adjacent said bulk storage zone and terminating at its downstream end in a second vertical wall above said outlet, said top wall and said first and second vertical walls being attached to said plenum; and
    a horizontal blow-back opening means in said second vertical wall only adjacent said top wall communicating with said plenum for blowing air only along the surface of said top wall to draft articles toward said top wall which are not aligned in said layout path and then blow them upstream in said layout zone above the aligned row of articles toward said bulk storage zone, said second vertical wall being substantially impervious to the passage of air below said opening means.

2. Apparatus, as claimed in claim 1, wherein:
    said top wall is horizontal and generally parallel to the lower extremities of the sidewalls so that the velocity of the blow-back air is no greater at the upstream end of said layout zone than it is at the downstream end thereof.

3. Apparatus, as claimed in claim 2, further including:
    a series of lateral slots in said horizontal wall, said slots being slanted upstream and communicating said layout path with said plenum for creating a stream of air blowing upstream along said top wall to form a low pressure area therealong to assist in drafting articles which are aligned in said layout path upward above properly aligned articles, and for blowing them back through said layout zone toward said bulk storage zone, said blow-back air creating above-ambient air pressure in said layout zone.

4. Apparatus, as claimed in claim 1, further including:
    means for varying the height of said horizontal blow-back opening means.

5. An improved air single filer apparatus for receiving cylindrical articles in upright position in random bulk and discharging them serially in horizontal single file, said apparatus comprising:
    a pair of spaced sidewalls having a lower extremity and defining a bulk storage zone and an adjacent layout zone having an outlet for discharging the articles in single file and a layout path extending through said layout zone between said bulk storage zone and said outlet, said sidewalls being spaced a distance slightly greater than the height of the article to be worked upon;
    a plenum connectable to a source of air under pressure attached to each sidewall in substantially coextensive relation therewith;
    a row of air jet openings through each of said sidewalls communicating said plenums with said layout zone and positioned generally parallel to said lower extremity for advancing the articles in single file from the bottom of said bulk storage zone to said outlet;
    means for exhausting air from said layout zone;
    a top wall in said layout zone extending between said sidewalls spaced just over two article diameters above said lower extremity of said sidwalls, said top wall terminating at its upstream end in a first vertical wall adjacent said bulk storage zone and terminating at its downstream end in a second vertical wall above said outlet, said top wall and said first and second vertical walls being attached to said plenum;

a blow-back opening in said second vertical wall in the form of a horizontal slot only adjacent said top wall communicating with said plenum for blowing air only along the surface of said top wall to draft articles toward said top wall which are not aligned in said layout path and blow them upstream in said layout zone toward said bulk storage zone;

a rectangular blow-back damper located upstream from and adjacent to said second vertical wall;

rectangular shoulders at the upper outside corners of said damper, defining a rectangular recess therebetween;

a vertical slot in said second vertical wall;

a bolt mounted through said damper and passing through said slot; and a wing nut on the end of said bolt which may be tightened to hold said damper in place and which allows vertical movement of said damper when loosened, for varying the height of said blow-back slot.

* * * * *